Aug. 29, 1967  E. C. CORNELL, JR  3,338,492
SELECTIVE WIRE FEEDER FOR PLURAL SOURCES
Filed Oct. 18, 1965  2 Sheets-Sheet 1

Inventor:—
Elliott C. Cornell, Jr.,
By Orson, Jackson Boettcher &
Dienner Attys.

Aug. 29, 1967  E. C. CORNELL, JR  3,338,492
SELECTIVE WIRE FEEDER FOR PLURAL SOURCES
Filed Oct. 18, 1965  2 Sheets-Sheet 2
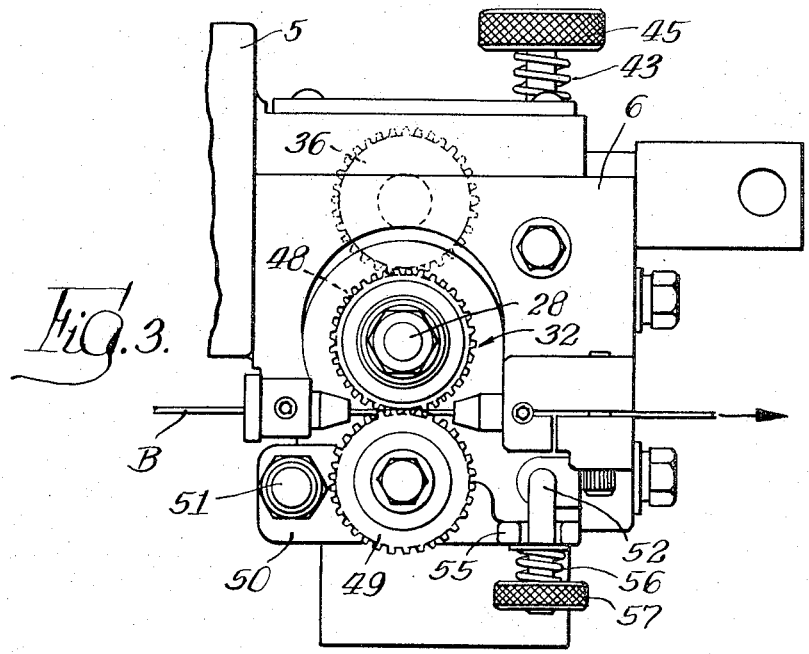
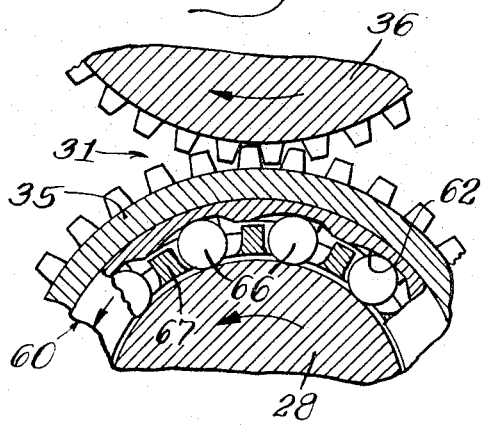
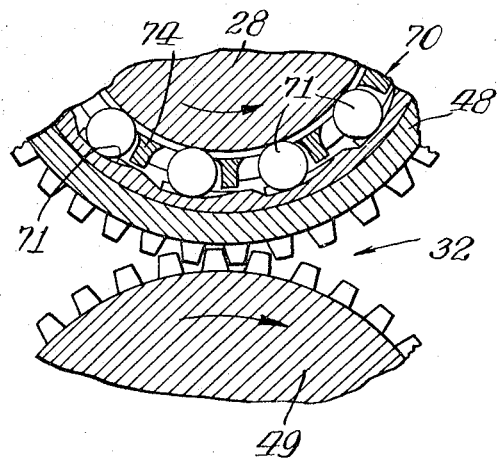
Inventor:—
Elliott C. Cornell, Jr.,
By Ooms, Jackson Boettcher & Dienner
Attys.

United States Patent Office 3,338,492
Patented Aug. 29, 1967

3,338,492
SELECTIVE WIRE FEEDER FOR PLURAL SOURCES
Elliott C. Cornell, Jr., Brecksville, Ohio, assignor to The Auto Arc-Weld Manufacturing Company, Cleveland, Ohio, a corporation of Ohio
Filed Oct. 18, 1965, Ser. No. 496,968
4 Claims. (Cl. 226—110)

The present invention relates to wire feeders and more particularly to dual wire feeders in which wire may be selectively fed from either of two sources of wire supply to a point of use.

Dual wire feeders of the character noted are known and are commonly employed in the welding art for a variety of purposes. For example, in instances where welding wires of different compositions are required to be used intermittently or alternately, wire is fed from one or the other supply source in accordance with the requirements of the welder. Also, in many welding operations welding wires of different compositions are required in making a plurality of joints between parts being welded. Additionally, in welding operations in which the same welding wire is used throughout, a dual source of supply of such welding wire is advantageous in the event difficulties develop with feeding of the wire from one of the two supply sources.

In the known dual wire feeders, wire feeding means are provided at the opposite ends of a drive shaft rotated in a single direction by an electric motor. The wire feeding means each comprise wire feeding roller means and associated wire pressure roller means, with the latter usually being spring biased toward the wire feeding roller means to define a wire feeding coupling so as to provide for drawing wire from a supply and feeding the same to a welding gun or point of use. Manually operated cams are provided for moving the pressure roller means to operative or inoperative positions with respect to their associated wire feeding roller means so that the operator by manipulating one or the other of the cam means for the dual wire feeding means may render one operative and the other inoperative so as to deliver or feed wire from the desired source.

The foregoing known dual wire feeders are subject to the disadvantage of requiring a welder to leave his welding position to manipulate the aforementioned cams to change from one to the other of the two supply sources of wire.

In order to avoid the forenoted disadvantage of known dual wire feeders, it is the purpose of the present invention to provide a dual wire feeder which the operator may control remotely and without leaving his position at the place of use of the wire to provide for the selective delivery of wire from one of two sources of wire supply.

Accordingly, it is an object of the present invention to provide a dual wire feeder having a reversible electric motor as a source of motive power, and including means operative in the forward and reverse rotation of the motor to feed wire selectively from first or second sources of supply of wire.

In a dual wire feeder as aforenoted, a welder, for example, by simply manipulating switch means associated with the welding guns may remotely control forward or reverse energization of the reversible motor to provide for feeding of the desired welding wire from either one of two sources.

In order to achieve the above object, it is proposed according to the present invention to provide a drive shaft which may be selectively driven in clockwise or counterclockwise direction in response to selected direction of rotation of the reversible electric motor. Wire feeding means is provided at each end of the drive shaft comprising wire roller feeding means and pressure roller means. Oppositely acting one-way motion transmitting means, which may be of any suitable known one-way clutches, are associated, one with each of the wire feeding means, so that upon energization of the reversible electric motor in one direction, one of the wire feeding means draws wire from a first supply for feeding to a first welding gun or point of use, and upon energization of the reversible electric motor in its other direction of rotation, the other of the wire feeding means draws wire from a second supply source for feeding to a second welding gun or point of use. In the arrangement of the one-way motion transmitting means, when one wire feeding means is operative for feeding wire the other wire feeding means is inoperative.

Now, in order to acquaint those skilled in the art with the manner of constructing and operating a dual wire feeder in accordance with the present invention, there shall be described below in connection with the accompanying drawings a preferred embodiment of the invention.

In the drawings:

FIGURE 3 is an elevational view of the forward end portion of the other side of the wire feeder of FIGURE 1 with the forward end of the feeder facing to the right;

FIGURE 4 is a detail vertical sectional view through the wire feeding roller means at the side of the wire feeder as seen in FIGURE 1; and FIGURE 5 is a detail vertical sectional view through the wire feeding roller means at the side of the wire feeder as viewed in FIGURE 3.

Figure 1:
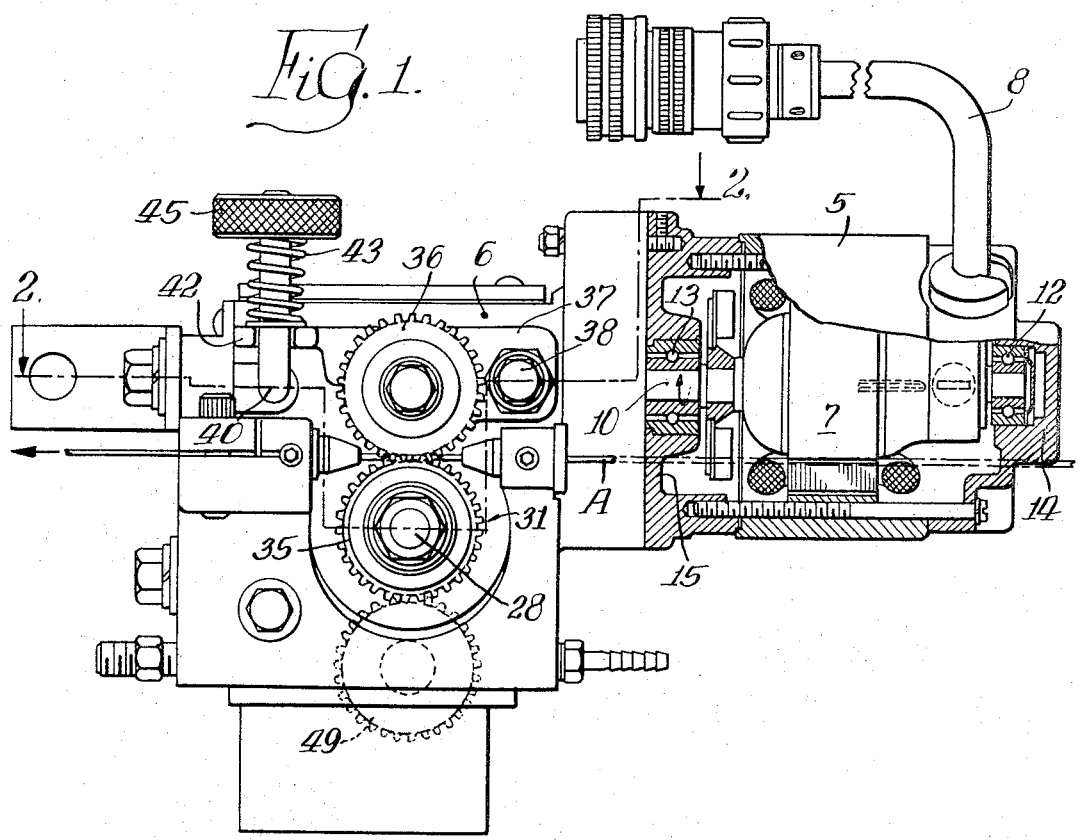
FIGURE 1 is an elevational view of one side of a wire feeder arranged with its forward end facing to the left, constructed in accordance with the principles of the present invention, and in which a portion of a motor housing at the rear of the feeder is broken away to better illustrate a reversible electrical motor embodied in the feeder of the invention.

Referring now to FIGURE 1 of the drawings, the wire feeder there shown is adapted to be suitably supported upon a stand or frame (not shown) and which frame or stand also provides, in a conventional manner, for rotatably supporting a pair of reels or supply sources of welding wire or the like rearwardly of the wire feeder for feeding of wire from one reel or source toward the forward end of the wire feeder and to a first welding gun or a point of use, such as illustrated at path A, along the right hand side of the feeder as seen in FIGURE 1, and from the other of such reels or sources, as illustrated at path B, along the left hand side of the feeder as seen in FIGURE 3 to a second welding gun or point of use. The reference to forward and rearward and left and right hand sides of the feeder are for purposes of clarity in describing the invention to make clear the associated and relative relationship of the components of the invention.

The wire feeder comprises a motor housing 5 which is suitably secured to gear housing 6 as by a plurality of bolts. A conventional reversible electric motor 7 is housed in motor housing 5 and lead means, indicated at 8, provides for connection of the motor to a suitable source of electrical potential. The motor 7 comprises an armature shaft 10 rotatably supported at its opposite ends in bearing assemblies 12 and 13 supported in the outer end wall 14 and end wall 15 respectively, of housing 5.

Figure 2:
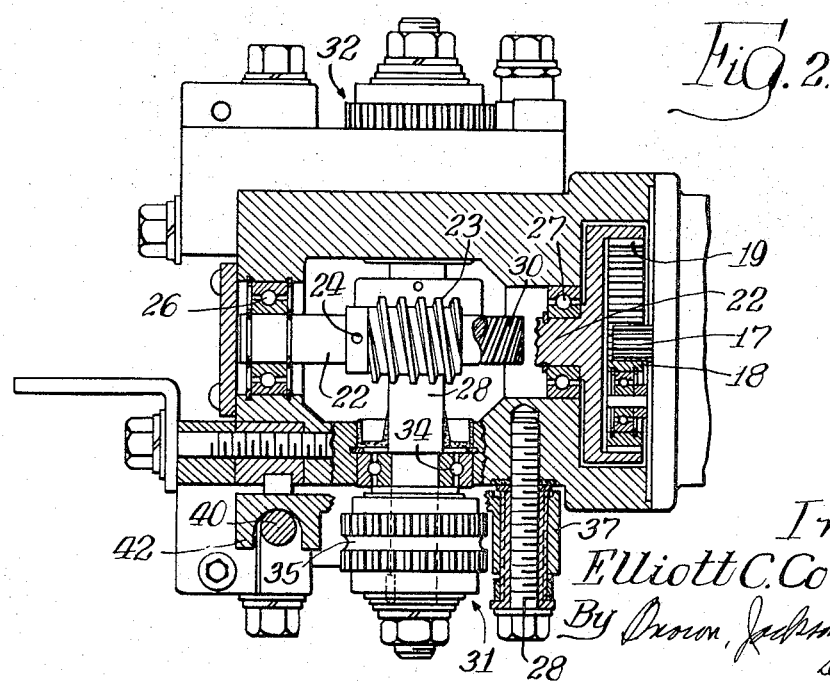
FIGURE 2 is a sectional view taken substantially along the line 2—2 of FIGURE 1 looking in the direction indicated by the arrows.

As best seen in FIGURE 2, the inner end of armature shaft 10 is provided with a pinion 17 which has meshing engagement with a idler gear 18 which, in turn, meshes with internal ring gear 19, housed within the end of gear housing 6 abutting the motor housing 5. The internal ring gear 19 is formed as part of an input shaft 22 to an intermediate portion of which a worm 23 is suitably secured as by pin 24. The opposite end portions of input shaft 22 are rotatably supported in bearings as at 26 and 27 within gear housing 6. The forgoing components provide means for driving a drive shaft 28 extending transversely of gear housing 6 through a helical gear 30 secured at an intermediate portion of the latter and having meshing engagement with the worm 23. The opposite ends of drive shaft 28 project outwardly of the sides of gear housing 6 and at the right hand side thereof, as viewed in FIGURE 1, has first wire feeding means 31 associated therewith, and at the left hand side thereof, as viewed in FIGURE 3, has second wire feeding means 32 associated therewith. Opposite end portions of drive shaft 28 are rotatably supported in bearings supported in the side walls of gear housing 6 with one such bearing assembly being typically shown at 34 in FIGURE 2.

The first wire feeding means 31 comprises a first wire feed roller means 35 and first pressure roller means 36 which together provide for drawing wire from a first supply reel through the wire feeder and to a place of delivery such as indicated at path A. The pressure roller means 36 is mounted for rotation intermediate the ends of a pressure roller carrier 37 pivotally mounted at one end as at 38 to the right hand side of gear housing 6 as viewed in FIGURE 1. A stud 40 connected at one end to gear housing 6 extends through a bifurcated bracket portion 42 at the other end of pressure roller carrier 37. A coil spring 43 surrounds stud 40 between bifurcated bracket portion 42 and a knob 45 threaded at the outer end on stud 40 provide for adjustably spring loading the pressure roller 36 with respect to wire feed roller 35. As illustrated in FIGURE 1, the pressure roller 36 is disposed in juxtaposition of and above wire feed roller 35 for purposes described below.

Upon reference to FIGURE 3, it will be seen that the second wire feeding means 32 comprises a second wire feed roller means 48 and a second pressure roller means 49. The second pressure roller 49 is rotatably mounted intermediate the ends of pressure roller carrier 50 which is pivotally mounted at one end as at 51. A stud 52 mounted at one end to the gear housing 6 extends through bifurcated bracket portion 55 at the other end of pressure roller carrier 50. A coil spring 56 is arranged between the bifurcated bracket portion 55 and an adjustment nut 57 threaded on the outer end of the stud 52 to provide for spring loading of the pressure roller with respect to the feed roller 48 for feeding wire from a second source of supply in path B through the wire feeder from the rear to the front thereof. As seen in FIGURE 3 the pressure roller 49 is disposed in juxtaposition of and below wire feeder roller 48.

Referring now to FIGURE 4, it will be seen that the wire feed roller 35 of wire feeding means 31 is associated with the outer end of shaft portion 28 there being one-way motion transmitting means, indicated generally at 60, provided between the shaft 28 and the feed roller 35. The one-way motion transmitting means 60 shown is in the form of a conventional one-way clutch in which the feed roller 35 is provided with internal ramps 62 which, together with a plurality of rollers 66, carried in a cage 67 disposed about shaft 28 provide, upon rotation of shaft 28 in a counterclockwise direction as seen in FIGURE 4, for engaging the rollers with the ramps 62 to provide for a conjoint rotation of shaft 28 and feed roller 35 in a counterclockwise direction. Upon rotation of shaft 28 in a clockwise direction the rollers 66 disengage from the ramps 62 so that no rotation is imparted to feed roller 35.

In FIGURE 5 there is illustrated second one-way motion transmitting means 70 associated with the second feed roller 48 of the second wire feeding means 32 and the adjacent end of shaft 28. In the one-way motion transmitting means 70 the second feed roller 48 is provided with ramps 71 inclined in opposite direction from the ramps 62 of motion transmitting means 60. Rollers 71 carried in a cage 74 disposed around shaft 28, upon clockwise rotation of shaft 28 as viewed in FIGURE 1, or counterclockwise as viewed in FIGURE 3, engage with the ramps 71 to effect rotation of the second wire feed roller 48 which together with pressure roller 49 effects drawing of wire from a second source of supply in path B from the rear to the front end of the wire feeder.

In the foregoing arrangement of the one-way motion transmitting means 60 and 70 with the left and right hand wire feeding means 31 and 32 as aforedescribed, rotation of the drive shaft 28 in a counterclockwise direction as viewed in FIGURE 1 engages one-way motion transmitting means 60 to drive wire feed roller 35 which, together with the pressure roller 36, effects movement of the wire from a first source of supply along path A. Upon rotation of drive shaft 28 in a clockwise direction, as viewed in FIGURE 1, one-way motion transmitting means 70 at the right hand side of the wire feeder effects rotation of wire feed roll 48 which, together with pressure roller 49, effects drawing wire from a second source of supply from the rear to the front of the wire feeder along path B.

Upon engagement of one-way motion transmitting means 60 the one-way motion transmitting means 70 overruns so that wire is fed only from the first source of supply along path A. Conversely, upon engagement of one-way motion transmitting means 70 one-way motion transmitting means 60 overruns so that wire is fed only from the second source of supply through the wire feeder from the rear to the front thereof along path B.

In the above apparatus the selective engagement of one-way motion transmitting means 60 and 70 is determined by the direction of rotation of the drive shaft 28 and the direction of rotation of the latter in turn is determined by the direction of energization of the reversible electrical motor 7. The motor 7 may be energized for rotation in one direction or the other in known manner by simple switch means disposed, for example, at the welding guns receiving the wires at the forward ends of paths A and B or any other place that may be convenient for an operator to select the desired delivery from one source of supply or the other by the simple expedient of controlling the direction of energization of the electric motor.

While there has been shown and described a preferred embodiment of the invention it will be understood that obvious modifications and rearrangements may be made therein without departing from the spirit and scope of the invention.

The invention claimed is:

1. In a wire feeder the combination of a rotatable drive shaft, a reversible drive motor for selectively rotating said drive shaft in a clockwise or counterclockwise direction, wire feeding means comprising first and second wire feed roller means at the opposite ends of said drive shaft, and first and second pressure roller means in juxtaposition of said first and second feed roller means, respectively, to provide for feeding of wire therebetween, and oppositely acting one-way motion transmitting means between said first and second feed roller means and the opposite ends of said drive shaft operative upon clockwise and counter-clockwise rotation of said drive shaft to rotate one or the other of said feed roller means.

2. In a wire feeder the combination of a rotatable drive shaft, a reversible drive motor for selectively rotating said drive shaft in a clockwise or counterclockwise direction, wire feeding means comprising first and second wire feed roller means at the opposite ends of said drive shaft, and first and second pressure roller means disposed in juxtaposition above and below said first and second feed roller means, respectively, to provide for feeding of wire therebetween from one end to the other end of said feeder, and oppositely acting one-way motion transmitting means between said first and second feed roller means and the opposite ends of said drive shaft operative upon clockwise and counterclockwise rotation of said drive shaft to rotate one or the other of said feed roller means.

3. In a dual wire feeder having a housing, the combination of a drive shaft rotatably mounted in and having its outer ends extending outwardly of the sides of said housing, a reversible drive motor for selectively rotating said drive shaft in a clockwise or counter-clockwise direction, wire feeding means comprising first and second wire feed roller means at the opposite outer ends of said drive shaft, and first and second pressure roller means disposed in juxtaposition above and below said first and second feed roller means, respectively, to provide for feeding of wire therebetween in parallel paths at opposite sides of and from the rear to front of said housing, and oppositely acting one-way motion transmitting means between said first and second feed roller means and said drive shaft operative upon clockwise and counter-clockwise rotation of said drive shaft to rotate one or the other of said feed roller means.

4. In a wire feeder having a housing, the combination of a drive shaft rotatably mounted in and having its outer ends extending outwardly of the sides of said housing, a reversible drive motor, means connecting said drive motor with said drive shaft whereby the latter may be rotated selectively in a clockwise or counter-clockwise direction, wire feeding means comprising first and second wire feed roller means at the outer ends of said drive shaft, and first and second pressure roller means disposed in juxtaposition above and below said first and second feed roller means, respectively, to provide for feeding of wire therebetween in parallel paths at opposite sides of and from the rear to the front of said housing, and oppositely acting one-way clutch means between said first and second feed roller means and the outer ends of said drive shaft operative upon clockwise and counter-clockwise rotation of said drive shaft to rotate one or the other of said feed roller means.

References Cited
UNITED STATES PATENTS

| | | | |
|---|---|---|---|
| 1,497,119 | 6/1924 | Reid et al. | 74—812 |
| 2,738,053 | 3/1956 | Leston et al. | 226—109 |
| 3,119,536 | 1/1964 | Berkeley | 226—110 |
| 3,209,621 | 10/1965 | Laurent | 74—812 |

M. HENSON WOOD, Jr., *Primary Examiner.*

ALLEN N. KNOWLES, *Examiner.*